(12) United States Patent
Korn et al.

(10) Patent No.: US 8,700,628 B1
(45) Date of Patent: Apr. 15, 2014

(54) PERSONALIZED AGGREGATION OF ANNOTATIONS

(75) Inventors: Jeffrey L. Korn, New York, NY (US); Dhyanesh H. Damania, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 13/366,183

(22) Filed: Feb. 3, 2012

Related U.S. Application Data

(60) Provisional application No. 61/439,339, filed on Feb. 3, 2011.

(51) Int. Cl.
*G06F 7/00* (2006.01)
*G06F 17/30* (2006.01)

(52) U.S. Cl.
USPC ........................................... 707/737; 707/741

(58) Field of Classification Search
USPC ................................................ 707/737, 741
See application file for complete search history.

(56) References Cited

U.S. PATENT DOCUMENTS

| 8,219,489 | B2* | 7/2012 | Patterson | 705/44 |
| 2005/0160065 | A1* | 7/2005 | Seeman | 707/1 |
| 2007/0011155 | A1* | 1/2007 | Sarkar | 707/5 |
| 2009/0164904 | A1* | 6/2009 | Horowitz et al. | 715/723 |
| 2010/0241988 | A1* | 9/2010 | Steeb et al. | 715/784 |

* cited by examiner

*Primary Examiner* — Jacob F Bétit
*Assistant Examiner* — Bao Tran
(74) *Attorney, Agent, or Firm* — Patent Law Works LLP

(57) ABSTRACT

A server system receives an annotation of a respective entity by an author. The respective entity has an entity identifier, and the annotation has a scope that identifies a range of access to the annotation. The system identifies one or more database entries in a database. A respective database entry includes a first value and a second value. Each database entry corresponds to a respective index key comprising an entity-scope combination. The entity-scope combination corresponds to a respective entity and a respective scope. The system updates the first value in each of the one or more identified entries, without updating the second value in each of the one or more identified entries. The system receives a request for one or more annotations, and sends information corresponding to an annotation value in response to the request.

13 Claims, 12 Drawing Sheets george.washington@usa.gov

| bbq | Search |

About 47,400,000 results (0.22 seconds)

Related searches for bbq:
Brands: Weber  Fire Magic  Big Green Egg  Coleman  Char-Broil
Stores: Barbeques Galore  Home Depot  Lowe's  Target  Sears Salt Lick Bar-B-Que Restaurant – Austin, Round Rock ... ☆ 🔍
The Salt Lick Bar-B-Que restaurants in Austin, round Rock, and the Texas Hill Country provide the perfect texas bar-b-q experience. Visiting Salt Lick is ...
www.saltlickbbq.com/ - Cached – Similar
☒ Thomas Jefferson shared this – 5 minutes ago BBQ – Gas Grills, Charcoal Grills, Electric Grills, and BBQ ... ☆ 🔍
We carry a full line of dcs gas grills, weber gas grills and more. Plus a large amount of charcoal grills, electric grills and bbq grilling accessories.
Gar Grills – Charcoal Grills – BBQ Smokers – Electric Grills
Http://www.bbq.com/ - Cached – Similar
☒ Thomas Jefferson, and ▥ John Adams shared this Barbecue – Wikipedia, the free encyclopedia ☆ 🔍
Barbecue or barbeque (common spelling variant) (with abbreviation BBQ, Bar-B-Q and diminutive form; Barbie, used chiefly in Australia or New Zealand; ...
Etymology – Styles – Events and gatherings – Techniques
Http://en.wikipedia.org/wiki/Barbecue – Cached – Similar
☒ Thomas Jefferson, ▥ John Adams, and 43 other people shared this Uncle Frank's BBQ ☆ 🔍
Uncle Frank's smoked meats include mouth watering Beef Brisket (smoked for over 30 hours) succulent Pork Ribs, delectable Beef Links and scrumptious ...
www.unclefranksbbq.com/ - Cached - Similar
2134 Old Middlefield Way, Mountain View
"First of all, I'ma fan of their sauce. It's sweet and tangy and spicey."
21 people in Northern California shared this

Figure 4

| Name 556-1 | Identifier 558-1 | Group(s) 560-1 | Affinity 562-1 |
| --- | --- | --- | --- |
| ... | ... | ... | ... |
| Name 556-p | Identifier 558-p | Group(s) 560-p | Affinity 562-p |

Contacts Data 552

554-1 (first row), 554-p (last row)

Figure 5C

┌─────────────────────────────────────────────────────────────────────┐
│ 602 In response to each of a plurality of occurrences of a first predefined trigger: │
│                                                                     │
│   ┌───────────────────────────────────────────────────────────┐     │
│   │ 604 Receive an annotation of a respective entity by an author. The │
│   │ respective entity has an entity identifier, and the annotation has a scope that │
│   │ identifies a range of access to the annotation.           │     │
│   └───────────────────────────────────────────────────────────┘     │
│                                                                     │
│   ┌───────────────────────────────────────────────────────────┐     │
│   │ 606 Identify one or more database entries in a database. A respective │
│   │ database entry includes a first value and a second value. Each database │
│   │ entry corresponds to a respective index key comprising an entity-scope │
│   │ combination. The entity-scope combination corresponds to a respective │
│   │ entity and a respective scope.                            │     │
│   │                                                           │     │
│   │   ┌ ─ ─ ─ ─ ─ ─ ─ ─ ─ ─ ─ ─ ─ ─ ─ ─ ─ ─ ─ ─ ─ ─ ─ ─ ─ ─ ┐ │     │
│   │   │ 608 The annotation is associated with an author identifier. Identifying │ │
│   │   │ one or more database entries includes identifying a predefined │ │
│   │   │ number of database entries in accordance with respective affinity │ │
│   │   │ values between an author of the annotation corresponding to the │ │
│   │   │ author identifier and respective users corresponding to the scope. │ │
│   │   └ ─ ─ ─ ─ ─ ─ ─ ─ ─ ─ ─ ─ ─ ─ ─ ─ ─ ─ ─ ─ ─ ─ ─ ─ ─ ─ ┘ │     │
│   │                                                           │     │
│   │   ┌ ─ ─ ─ ─ ─ ─ ─ ─ ─ ─ ─ ─ ─ ─ ─ ─ ─ ─ ─ ─ ─ ─ ─ ─ ─ ─ ┐ │     │
│   │   │ 610 Identifying the one or more database entries includes: identifying │ │
│   │   │ respective users corresponding to the scope of the annotation; │ │
│   │   │ identifying secondary scopes associated with the respective users │ │
│   │   │ (each identified secondary scope includes the author); identifying one │ │
│   │   │ or more entity-scope combinations corresponding to the entity of the │ │
│   │   │ annotation and one of the secondary scopes; and identifying one or │ │
│   │   │ more database entries corresponding to the one or more identified │ │
│   │   │ entity-scope combination.                             │ │     │
│   │   └ ─ ─ ─ ─ ─ ─ ─ ─ ─ ─ ─ ─ ─ ─ ─ ─ ─ ─ ─ ─ ─ ─ ─ ─ ─ ─ ┘ │     │
│   └───────────────────────────────────────────────────────────┘     │
│                                                                     │
│   ┌───────────────────────────────────────────────────────────┐     │
│   │ 612 Update the first value in each of the one or more identified entries │
│   │ without updating the second value in each of the one or more identified │
│   │ entries                                                   │     │
│   └───────────────────────────────────────────────────────────┘     │
└─────────────────────────────────────────────────────────────────────┘

Figure 6A

614 Prior to receiving a request, in response to each of a plurality of occurrences of a second predefined trigger: retrieve a plurality of annotations; aggregate the retrieved annotations for respective index keys to produce aggregate values (each aggregated value is for a respective index key); identify a plurality of index keys corresponding to the index keys of a plurality of the aggregated values; and update the second values of database entries corresponding to the identified index keys with aggregated values for the identified index keys.

616 Updating the second values of the database entries corresponding to the identified index keys includes updating the first values of the database entries corresponding to the identified index keys 618 Respective annotations are associated with respective timestamps; and retrieving the plurality of annotations includes: determining a time range; and retrieving a plurality of annotations that corresponds to the determined time range.

620 Retrieving the plurality of annotations includes updating the first values of the plurality of annotations that corresponds to the determined time range 622 Aggregating the retrieved annotations for respective index keys includes, for each candidate annotation of the plurality of annotations: identifying respective users corresponding to a scope of the candidate annotation; identifying secondary scopes associated with the respective users (each identified secondary scope includes an author of the candidate annotation); identifying one or more candidate entity-scope combinations corresponding to an entity of the candidate annotation and one of the secondary scopes; and identifying one or more index keys (each index key includes a candidate entity-scope combination of the one or more identified candidate entity-scope combinations); and aggregating the retrieved annotations for the identified index keys.

Figure 6B

624 Receive, from a computer system or device distinct from the server system, a request for one or more annotations. The request identifies an entity and a scope.

626 Respond to the request by: retrieving, for an index key comprising an entity-scope combination corresponding to the entity and scope identified in the request, an annotation value from a database entry for the index key; and sending, to the computer system or device, information corresponding to the retrieved annotation value in response to the request. The annotation value corresponds to the first value and the second value of the database entry for the index key.

> 628 The annotation value corresponding to the first value and the second value is a sum of the first value and the second value.

> 630 Responding to the request includes, when the scope identified in the request corresponds to a plurality of scope identifiers: retrieving, for a plurality of index keys comprising a plurality of entity-scope combinations corresponding to the entity and scope identified in the request, annotation values corresponding to the first values and the second values of the database entries for the plurality of index keys, and combining the retrieved annotation values to produce one or more combined retrieved annotation values; and sending, to the computer system or device, information corresponding to the one or more combined retrieved annotation values in response to the request.

Figure 6C

PERSONALIZED AGGREGATION OF ANNOTATIONS

RELATED APPLICATIONS

This application claims priority to U.S. Provisional Application 61/439,339, filed Feb. 3, 2011, "Personalized Aggregation of Annotations," which is hereby incorporated by reference in its entirety.

BACKGROUND

The disclosed embodiments relate generally to managing computer databases. More particularly, the disclosed embodiments relate to methods and systems for aggregating data in computer databases for online services.

Computer networks play a significant role in our lives, as more people gain access to the computer networks (e.g., the Internet) and people use the computer networks for more activities. Increasingly, more people post comments or share items (e.g., web pages, products, or comments made by other users) online. However, existing methods are not efficient at managing such user-generated data. Therefore, there is a need for a new method and system for managing the user-generated data.

SUMMARY

A number of embodiments (e.g., of server systems, client systems or devices, and methods of operating such systems or devices) that overcome the limitations and disadvantages described above are presented in more detail below. These embodiments provide methods, systems, and graphical user interfaces (GUIs) for managing user-generated data (e.g., annotations).

As described in more detail below, some embodiments of the invention involve a method performed at a server system having one or more processors and memory storing one or more programs for execution by the one or more processors. The method includes, in response to each of a plurality of occurrences of a first predefined trigger, receiving an annotation of a respective entity by an author. The respective entity has an entity identifier, and the annotation has a scope that identifies a range of access to the annotation. The method also includes identifying one or more database entries in a database. A respective database entry includes a first value and a second value. Each database entry corresponds to a respective index key comprising an entity-scope combination, and the entity-scope combination corresponds to a respective entity and a respective scope. The method includes updating the first value in each of the one or more identified entries without updating the second value in each of the one or more identified entries. The method includes receiving, from a computer system or device distinct from the server system, a request for one or more annotations. The request identifies an entity and a scope. The method furthermore includes responding to the request by: retrieving, for an index key comprising an entity-scope combination corresponding to the entity and scope identified in the request, an annotation value from a database entry for the index key; and sending, to the computer system or device, information corresponding to the retrieved annotation value in response to the request. The annotation value corresponds to the first value and the second value of the database entry for the index key.

In accordance with some embodiments, a method is performed at a server system having one or more processors and memory storing one or more programs for execution by the one or more processors. The method performed at the server system includes: retrieving a plurality of annotations, and identifying respective index keys for respective annotations in the plurality of annotations. Each index key includes an entity-scope combination corresponding to a respective entity and a respective scope of at least one annotation in the plurality of annotations. The method also includes storing in an index references to the plurality of annotations. The stored references are organized in the index in accordance with the index keys of the annotations in the plurality of annotations. The method includes receiving, from a computer system or device distinct from the server system, a request for one or more annotations. The request identifies an entity and a scope. The method furthermore includes responding to the request by: accessing the index to identify one or more annotations that correspond to at least one index key for the identified entity and scope; and sending, to the computer system or device, information corresponding to the one or more identified annotations.

In accordance with some embodiments, a method is performed at a server system having one or more processors and memory storing one or more programs for execution by the one or more processors to perform the method. The method includes: retrieving a plurality of annotations, and identifying respective index keys for respective annotations in the plurality of annotations. Each index key includes an entity-location combination corresponding to a respective entity and a respective author location for at least one annotation in the plurality of annotations. The method also includes storing in an index references to the plurality of annotations. The stored references are organized in the index in accordance with the index keys of the annotations in the plurality of annotations. The method includes receiving, from a computer system or device distinct from the server system, a request for one or more annotations. The request identifies an entity and a location. The method furthermore includes responding to the request by: accessing the index to identify one or more annotations that correspond to at least one index key for the identified entity and location; and sending, to the computer system or device, information corresponding to the one or more identified annotations.

In some implementations, the method includes responding, prior to receiving the request, to each of a plurality of occurrences of a second predefined trigger by retrieving a plurality of annotations; aggregating the retrieved annotations for respective index keys to produce aggregated values, wherein each aggregated value is for a respective index key; identifying a plurality of index keys corresponding to the index keys of a plurality of the aggregated values; and updating the second values of database entries corresponding to the identified index keys with aggregated values for the identified index keys. In some implementations, updating the second values of the database entries corresponding to the identified index keys includes updating the first values of the database entries corresponding to the identified index keys.

In some implementations, respective annotations are associated with respective timestamps, and retrieving the plurality of annotations includes determining a time range, and retrieving a plurality of annotations that corresponds to the determined time range. Furthermore, in some implementations, retrieving the plurality of annotations includes updating the first values of the plurality of annotations that corresponds to the determined time range.

In some implementations, aggregating the retrieved annotations for respective index keys includes, for each candidate annotation of the plurality of annotations, identifying respective users corresponding to a scope of the candidate annotation; identifying secondary scopes associated with the respective users, wherein each identified secondary scope includes an author of the candidate annotation; identifying one or more candidate entity-scope combinations corresponding to an entity of the candidate annotation and one of the secondary scopes; and identifying one or more index keys, each index key comprising a candidate entity-scope combination of the one or more identified candidate entity-scope combinations; and then aggregating the retrieved annotations for the identified index keys.

In some implementations, identifying the one or more database entries includes identifying respective users corresponding to the scope of the annotation, identifying secondary scopes associated with the respective users, wherein each identified secondary scope includes the author, identifying one or more entity-scope combinations corresponding to the entity of the annotation and one of the secondary scopes, and identifying one or more database entries corresponding to the one or more identified entity-scope combination.

In some implementations, responding to the request includes, when the scope identified in the request corresponds to a plurality of scope identifiers, retrieving, for a plurality of index keys comprising a plurality of entity-scope combinations corresponding to the entity and scope identified in the request, annotation values corresponding to the first values and the second values of the database entries for the plurality of index keys, and combining the retrieved annotation values to produce one or more combined retrieved annotation values; and sending, to the computer system or device, information corresponding to the one or more combined retrieved annotation values in response to the request.

In some implementations, the annotation is associated with an author identifier, and identifying one or more database entries includes identifying a predefined number of database entries in accordance with respective affinity values between an author of the annotation corresponding to the author identifier and respective users corresponding to the scope.

In accordance with some embodiments, a system comprises one or more processors for executing programs and memory storing one or more programs for execution by the one or more processors. The one or more programs include instructions executed by the one or more processors so as to perform any of the aforementioned methods.

In accordance with some embodiments, a non-transitory computer readable storage medium stores one or more programs configured for execution by one or more processors of a computer system. The one or more programs include instructions for performing any of the aforementioned methods.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 4 illustrates an exemplary user interface displayed at a client, in accordance with some embodiments.

FIG. 5C is a block diagram illustrating an exemplary data structure that includes contacts, in accordance with some embodiments.

FIGS. 6A-6C are flowcharts representing a method of aggregating and sharing annotations, in accordance with some embodiments.

Like reference numerals refer to corresponding parts throughout the drawings.

DESCRIPTION OF EMBODIMENTS

Methods and systems for identifying best matching candidate identifiers in social networking services are described. Reference will be made to certain embodiments of the invention, examples of which are illustrated in the accompanying drawings.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact. The first contact and the second contact are both contacts, but they are not the same contact.

The terminology used in the description of the embodiments herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination," "upon detecting" or "in response to detecting" that the stated condition precedent is true, depending on the context.

As used herein, the term "URL" refers to a uniform resource locator, which is sometimes called a uniform resource identifier (URI).

Figure 1:
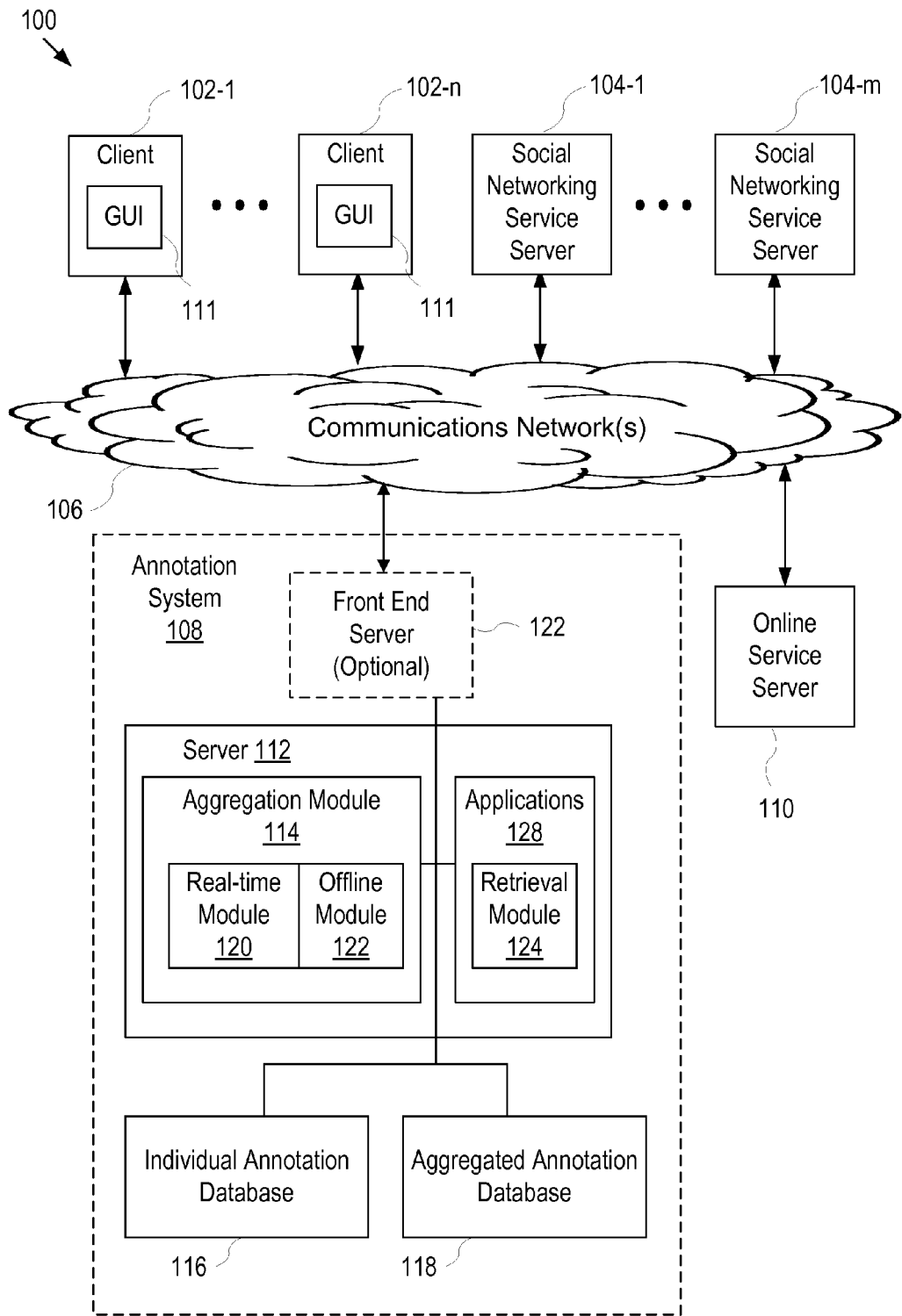
FIG. 1 is a block diagram illustrating an exemplary distributed computer system, in accordance with some embodiments.

FIG. 1 is a block diagram illustrating an exemplary distributed computer system 100, according to certain embodiments. In FIG. 1, the system 100 includes one or more client computers 102, a communications network 106, and an annotation system 108. Various embodiments of the annotation system 108 implement the methods described in this document.

FIG. 1 also illustrates one or more social networking service servers 104 and at least one online service server 110 (e.g., a search engine, a mail server, etc.) coupled with the communications network 106. Social networking service servers 104 are servers that provide social networking services. For example, the social networking service servers provide services for sharing information (e.g., short messages, postings, microblogs, web logs, comments, etc.) among social networking service users. The online service server 110 provides online services, such as web search services, email services, etc.

Client computers 102 can be any of a number of computing devices (e.g., Internet kiosk, personal digital assistant, cell phone, gaming device, desktop computer, laptop computer, tablet computer, handheld computer, or combinations thereof) used to enable the activities described below. Client computer(s) 102 is also referred to herein as client(s), client device(s), or client system(s). Client 102 typically includes a graphical user interface (GUI) 111. Client 102 is described in greater detail below with reference to FIG. 3. Client 102 is connected to annotation system 108 via communications network 106. As described in more detail below, GUI 111 is used to display web documents Annotation system 108 provides information to a server system (e.g., online service server 110 and/or social networking service server 104) or client 102.

Annotation system 108 includes one or more servers, such as server 112, connected to communications network 106. Optionally, the one or more servers are connected to communications network 106 via front end server 122. In some embodiments, front end server 122 conveys (and optionally parses) inbound requests to the appropriate server of annotation system 108, and formats responses and/or other information being sent to other servers or clients in response to requests. Front end server 122, if present, may be a web server providing web based access to annotation system 108. In some embodiments, the front end server is a server in a database server system. Front end server 122, if present, may also route communications to and from other destinations, such as a remote online service server 110 (e.g., a search engine, email server, etc.).

Annotation system 108 typically includes individual annotation database 116 and aggregated annotation database 118. In some embodiments, annotation system 108 also includes or has access to one or more other databases, such as a user information database (not shown) and contacts database (e.g., 226, FIG. 2). Server 112 includes aggregation module 114 and applications 128. Server 112 communicates with one or more databases internal to annotation system 108, such as individual annotation database 116 and aggregated annotation database 118 using a local area network, by internal communication busses, or by any other appropriate mechanism or combination of mechanism.

Server 112 is also referred to herein as a server system. Server 112 communicates with other servers (e.g., social networking service server(s) 104 and online service server(s) 110) and/or clients 102 via front end server 122 (if present) and communication network(s) 106. In some embodiments, communications network 106 is the Internet. In other embodiments, communication network 106 can be any local area network (LAN), wide area network (WAN), metropolitan area network, or a combination of such networks. In some embodiments, server 112 is used within an intranet, and thus it may be called an intranet server.

Applications 128 include application programs used for managing annotation system 108. In some embodiments, applications 128 include annotation retrieval module 124, which assists in accessing the annotation databases (e.g., individual annotation database 116 and aggregated annotation database 118). Typically, annotation retrieval module 124 receives a request for annotations satisfying an index key, and retrieves and sends annotations satisfying the index key. In addition, annotation retrieval module 124 may assist in updating one or more annotation databases (e.g., individual annotation database 116). Individual annotation database 116 stores various annotations made by respective users. Aggregated annotation database 118 stores aggregated annotations or information about aggregated annotations (e.g., counts of particular types of annotations, such as a count indicating how many users shared a corresponding web page).

Aggregation module 114 aggregates annotations stored in individual annotation database 116 and stores the aggregated annotations in aggregated annotation database 118. In some embodiments, aggregation module 114 includes a plurality of modules for aggregating annotations, such as a combination of real-time aggregation module 120 and offline aggregation module 122. Real-time aggregation module 120 typically aggregates individual annotations in real-time, but only with respect to a portion of the scopes of those annotations. For example, the real-time aggregation module may initiate an aggregation operation whenever a new annotation is received (or when a predefined number of annotations are received). Offline aggregation module 122 aggregates a large number of individual annotations at once. Thus, offline aggregation module 122 may initiate an aggregation operation at a predefined interval (e.g., every 6 hours). The combination of real-time aggregation module 120 and offline aggregation module 122 is particularly beneficial, because real-time aggregation module 120 timely updates aggregated annotation database 118 in response to a new annotation, and offline aggregation module 122 updates aggregated annotation database 118 more thoroughly.

In essence, server 112 is configured to manage certain aspects of annotation system 108, including aggregating annotations and handling requests for annotations from a respective server (e.g., social networking service server 104 or online service server 110) and/or a respective client 102.

Optionally, annotation system 108 is implemented as part of a search engine (e.g., 110) or as part of social networking service server 104.

In some embodiments, fewer and/or additional modules, functions or databases are included in annotation system 108 and server 112. The modules shown in annotation system 108 and server 112 represent functions performed in certain embodiments.

Figure 2:
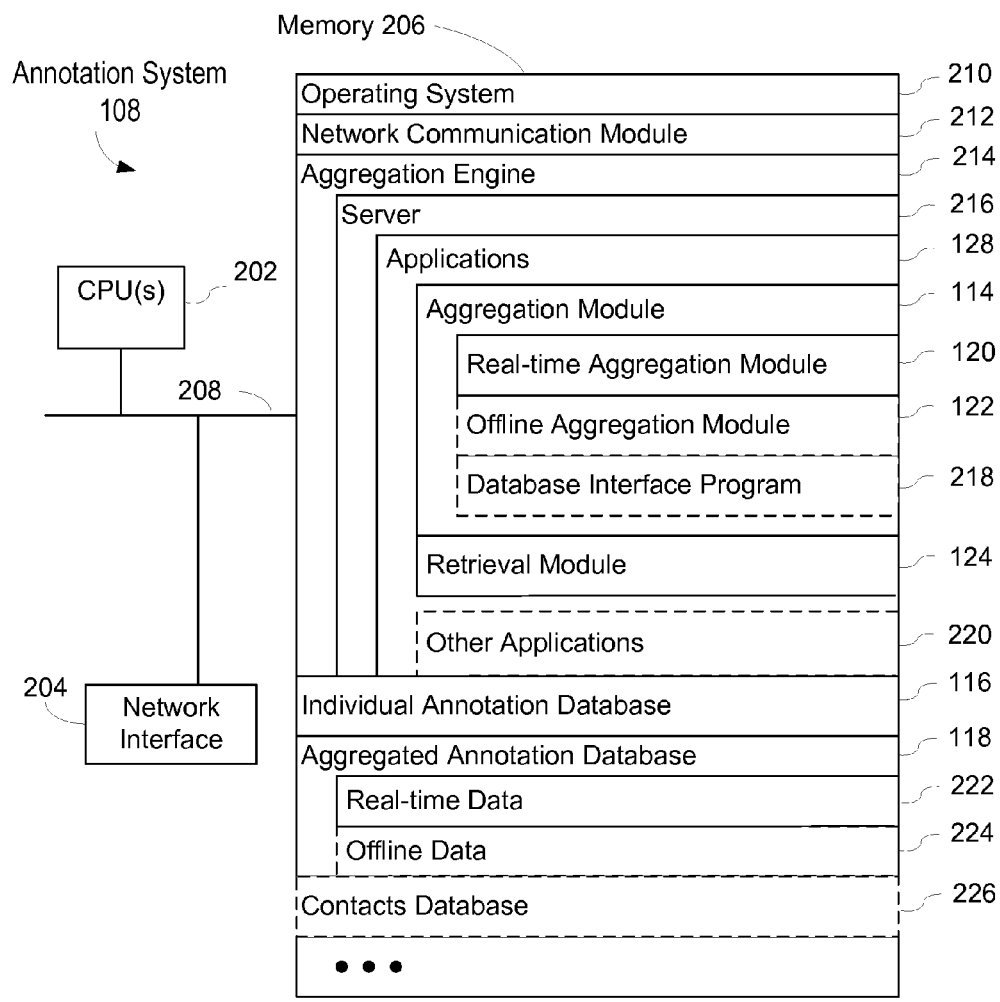
FIG. 2 is a block diagram illustrating an annotation system, in accordance with some embodiments.

FIG. 2 is a block diagram illustrating annotation system 108 in accordance with some embodiments Annotation system 108 typically includes one or more processing units (CPUs) 202, one or more network or other communications interfaces 204, memory 206, and one or more communication buses 208 for interconnecting these components. In some embodiments, communication buses 208 include circuitry (sometimes called a chipset) that interconnects and controls communications between system components. In some other embodiments, annotation system 108 includes a user interface (not shown) (e.g., a user interface having a display device, a keyboard, and a mouse or other pointing device), but more typically annotation system 108 is controlled from and accessed by various client systems (e.g., 102, FIG. 1).

Memory 206 of annotation system 108 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a non-transitory computer readable storage medium for storing information. In some embodiments, memory 206 or the computer readable storage medium of memory 206 stores the following programs, modules and data structures, or a subset thereof:

Operating System 210 that includes procedures for handling various basic system services and for performing hardware dependent tasks;

Network Communication Module (or instructions) 212 that is used for connecting annotation system 108 to other computers (e.g., online service server 110, social networking service servers 104, and/or clients 102) via one or more communications interfaces 204 and one or more communications networks 106 (FIG. 1), such as the Internet, other wide area networks, local area networks, metropolitan area networks, and so on;

Aggregation Engine 214 that aggregates annotations as well as provides responses to requests for annotations from other computers (e.g., online service server 110, social networking service servers 104, and/or clients 102);

Individual Annotation Database 116;

Aggregated Annotation Database 118, which includes real-time data 222 and offline data 224; and (Optional) Contacts Database 226, which includes contacts (e.g., address books) of a plurality of users. Contact data 226 is described in more detail below with reference to FIG. 5C.

In some embodiments, aggregation engine 214 includes one or more server modules 216, corresponding to server 112 in FIG. 1, for managing certain aspects of annotation system 108. In some embodiments, one or more server modules 216 include applications 128. Applications 128 include the following programs, modules and data structures, or a subset or superset thereof:

Aggregation Module 114 for aggregation functions of the annotation system;

Retrieval Module 124 for handling annotation requests; and (Optional) Other Applications 220.

As noted above, aggregation module 114 aggregates annotations stored in individual annotation database 116 and stores the aggregated annotations in aggregated annotation database 118. Aggregation module 114 includes real-time aggregation module 120. In some embodiments, aggregation module 114 also includes offline aggregation module 122. In some embodiments, aggregation module 114 includes database interface program 218 that assists retrieving and updating data in individual annotation database 116 and aggregated annotation database 118 (e.g., real-time data 222 and offline data 224).

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, aggregated annotation database 118 is part of or stored within server 112. In other embodiments, aggregated annotation database 118 is implemented using one or more servers whose primary function is to store and process annotation data. In some embodiments, individual annotation database 116 includes aggregated annotation database 118, or vice versa. In some embodiments, individual annotation database includes contacts database 226, or vice versa. In some embodiments, aggregation module 114 and retrieval module 124 are implemented in separate servers.

The number of servers used to implement annotation system 108 and how features are allocated among them will vary from one implementation to another, and may depend in part on the amount of data stored by annotation system 108, and may also depend on the amount of data traffic that the system must handle during peak usage periods as well as during average usage periods. Moreover, one or more of the blocks (e.g., server 112, individual annotation database 116, etc.) in FIG. 1 may be implemented on one or more servers designed to provide the described functionality. Although the description herein refers to certain features implemented in client 102 and certain features implemented in server 112, the embodiments are not limited to such distinctions. For example, features described herein as being part of server 112 can be implemented in whole or in part in client 102, and vice versa. In some embodiments, features described herein as being part of server 112 can be implemented in whole or in part in online service server 110 or social networking service server(s) 104.

Figure 3:
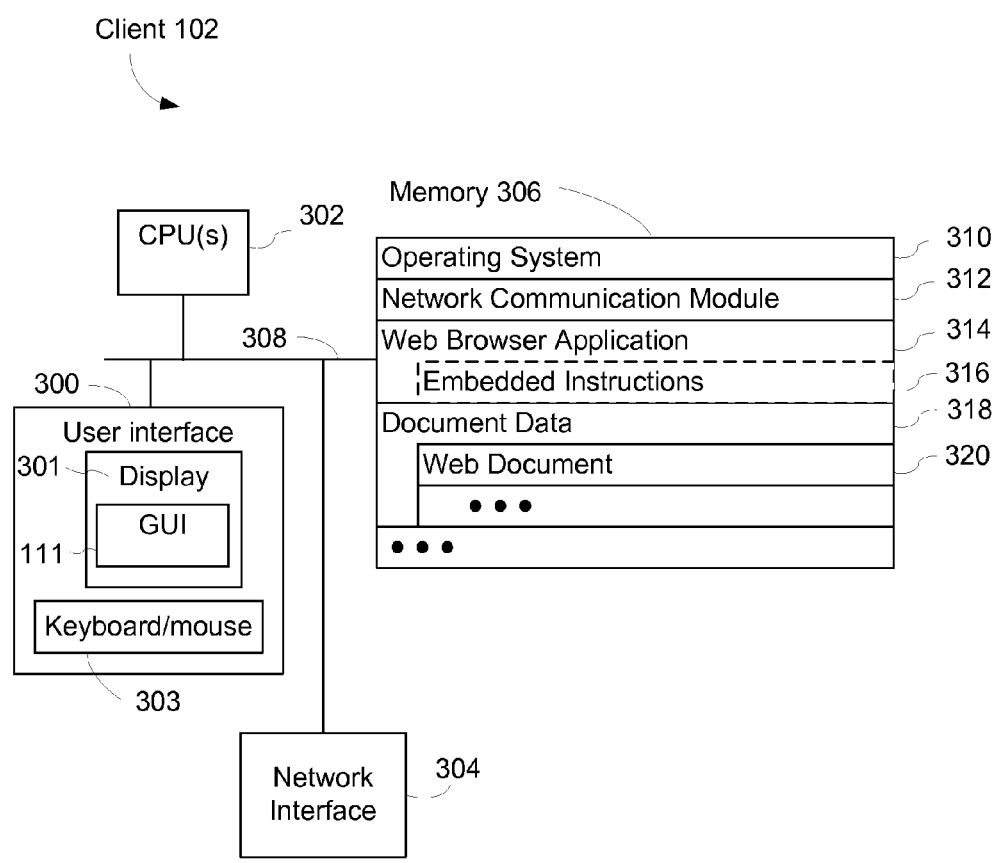
FIG. 3 is a block diagram illustrating a client, in accordance with some embodiments.

FIG. 3 is a block diagram illustrating client 102, also called a client system or a client device, in accordance with some embodiments. Clients 102 is configured for use by a subscriber (also herein called "the user") of an online service server 110 or social networking service server 104. Client 102 includes user interface 300, which typically includes display device 301, and one or more input devices 303 such as a keyboard and a mouse or other pointing device. As noted above, client 102 includes graphical user interface (GUI) 111, which is displayed on display device 301. Client 102 typically includes one or more processing units (CPUs) 302, one or more network or other network communications interfaces 304, memory 306, and one or more communication buses 308 for interconnecting these components. Communication buses 308 may include circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a non-transitory computer readable storage medium for storing information. In some embodiments, memory 306 or the computer readable storage medium of memory 306 stores the following programs, modules and data structures, or a subset thereof:

- Operating System 310 that includes procedures for handling various basic system services and for performing hardware dependent tasks;
- Network Communication Module (or instructions) 312 that is used for connecting the client 102 to other computers (e.g., the annotation system 108, a search engine 110, a social networking service server 104, and/or other clients 102) via one or more communications Network Interfaces 304 (wired or wireless) and one or more communication networks 106 (FIG. 1), such as the Internet, other wide area networks, local area networks, metropolitan area networks, and so on;
- Web Browser Application 314, which processes and initiates display of a web document (e.g., 320) in GUI 111; and
- Document Data 318, which includes web documents (e.g., 320, etc.).

In some embodiments, web browser application 314 or an extension, plug-in or toolbar of web browser application 314 includes embedded instructions 316 that send requests for, and receives, annotation information from annotation system 108 (FIG. 1).

Respective web document 320 is typically a webpage (or XML document or the like) received from annotation system 108. The respective web document includes information for display in GUI 111. In some embodiments, respective web document 320 includes embedded instructions for receiving document-related input from a computer user (e.g., a request search results) and for formatting web document 320 for display in GUI 111.

Optionally, memory 306 includes additional applications.

FIG. 4 illustrates exemplary user interface 400 displayed in GUI 111 of client 102, in accordance with some embodiments.

User interface 400 includes a search result page that indicates an email address 406, "george.washington@usa.gov," associated with the search result page (or the search request that corresponds to the search result page).

The search result page includes a search keyword "bbq," and a list of search results. The list of search results includes search results (e.g., 402-1 through 402-4) that correspond to the search keyword.

In FIG. 4, one or more search results 402 include annotations 404 (e.g., 404-1 through 404-4). For example, search result 402-1 includes annotation 404-1, indicating that another user (e.g., "Thomas Jefferson") shared with the user of email address 406 a web page (or its URL) that corresponds to search result 402-1. Search result 402-2 includes annotation 404-2, indicating that two other users shared with the user of email address 406 a web page (or its URL) that corresponds to search result 402-2. Search result 402-3 includes annotation 404-3 indicating that a plurality of users shared a corresponding web page. Search result 402-4 includes annotation 404-4 indicating that a plurality of users in a certain geographic area (e.g., Northern California) shared a corresponding web page.

As illustrated, an annotation may indicate that a user has shared a corresponding web page (or its URL). Additionally, or alternatively, an annotation may indicate that the user liked the corresponding web page (or content in the corresponding web page). In some embodiments, an annotation may include writings by the user (e.g., posts, comments, etc.).

Figure 5A:
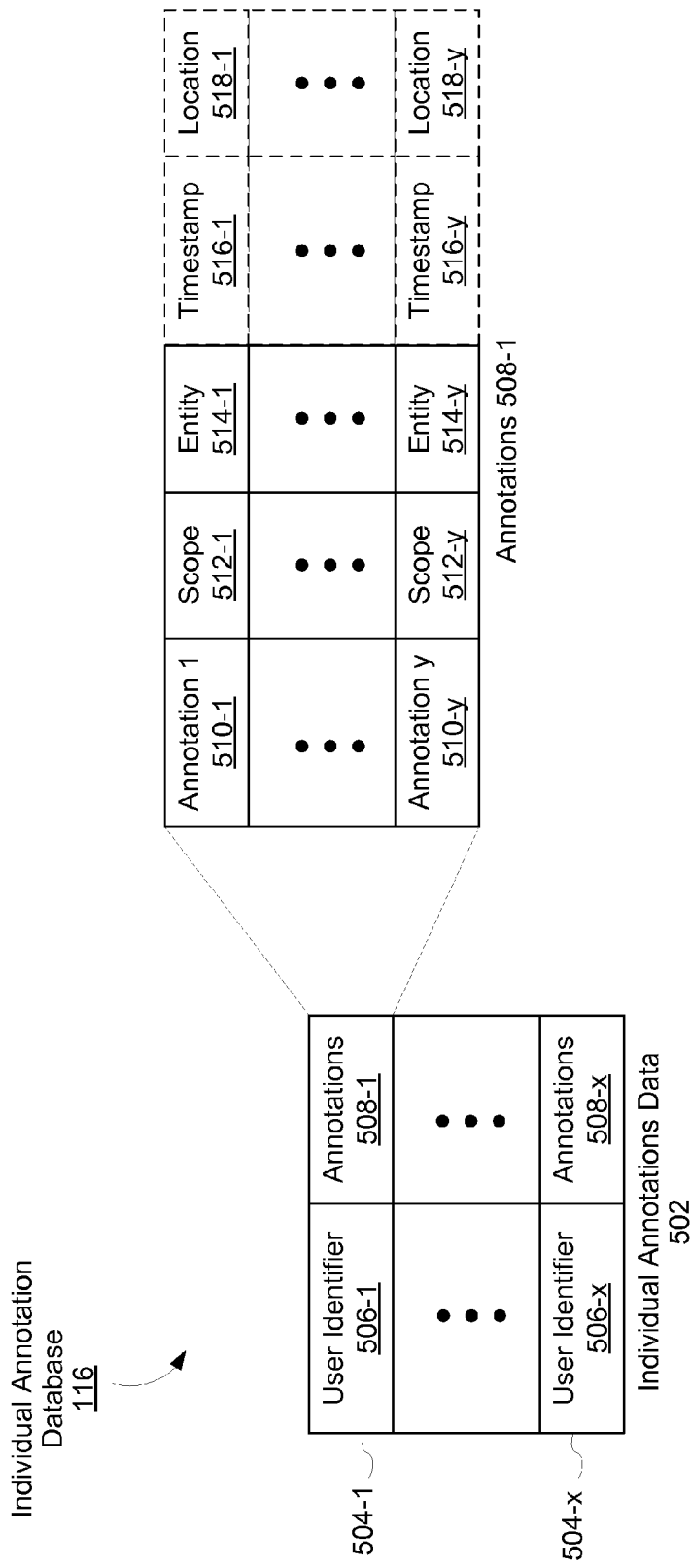
FIG. 5A is a block diagram illustrating exemplary individual annotations data, in accordance with some embodiments.

FIG. 5A is a block diagram illustrating exemplary individual annotations data 502, in accordance with some embodiments.

Individual annotations data 502 is stored in individual annotation database 116 (FIG. 2). Individual annotations data 502 includes individual annotation entries (or personal annotation entries), for example entry 1 (504-1) through entry x (504-x), where x represents the number of entries in individual annotations data 502. Each entry 504 is for a respective individual or respective user identifier (e.g., the database 116 would include two entries 504 for a user who makes annotations under two different user identifiers). A respective entry (e.g., entry 504-1) includes a user identifier (e.g., 504), such as a username, email address, etc. of the user who made or posted annotations 508. The respective entry (e.g., entry 504-1) also includes annotations (e.g., 508-1). Annotations (e.g., 508-1) include a plurality of annotations (e.g., 510-1 through 510-y) made by a user represented by a respective user identifier (e.g., 506-1).

A respective annotation (e.g., 510-1) may be a user's comment, post, sharing, or an indication of preference about an entity (e.g., 514-1). Respective annotation 510 has scope 512, entity 514, and in some embodiments, timestamp 516 and/or location 518. Scope 512 indicates users or one or more groups of users who may access respective annotation 510 and/or information about the respective annotation 510. For example, scope 512 for a particular annotation includes a list of user identifiers (e.g., usernames), a list of one or more groups (e.g., Jefferson's Friends), and/or a "public" scope, which indicates that anyone may access the respective annotation or information about the respective annotation.

The entity of this annotation may be the URL of the respective web page (e.g., the web page corresponding to search result 402-1) that is the subject of the annotation. Entity 514 represents an entity annotated by the respective annotation 510. For example, in FIG. 4, a user (e.g., Thomas Jefferson) has shared a web page that corresponds to search result 402-1. This may be stored as an annotation (e.g., 510) for the user (e.g., Thomas Jefferson) that indicates that the user has shared a respective web page (e.g., the web page corresponding to search result 402-1) or the URL of the respective web page. In such embodiments, entity (e.g., 514) may include the URL of the web page. Alternatively, entity 514 may be represented by an identifier that corresponds to the URL of the web page. For example, entity 514 may be a fixed length identifier (e.g., a hash of the URL of the web page, produced by applying a predefined hash function to the URL). Timestamp 516 indicates the time when respective annotation 510 was posted or recorded. Location 518 indicates a geographic location of the user (e.g., the user represented by user identifier 506) who posted the annotation.

Figure 5B:
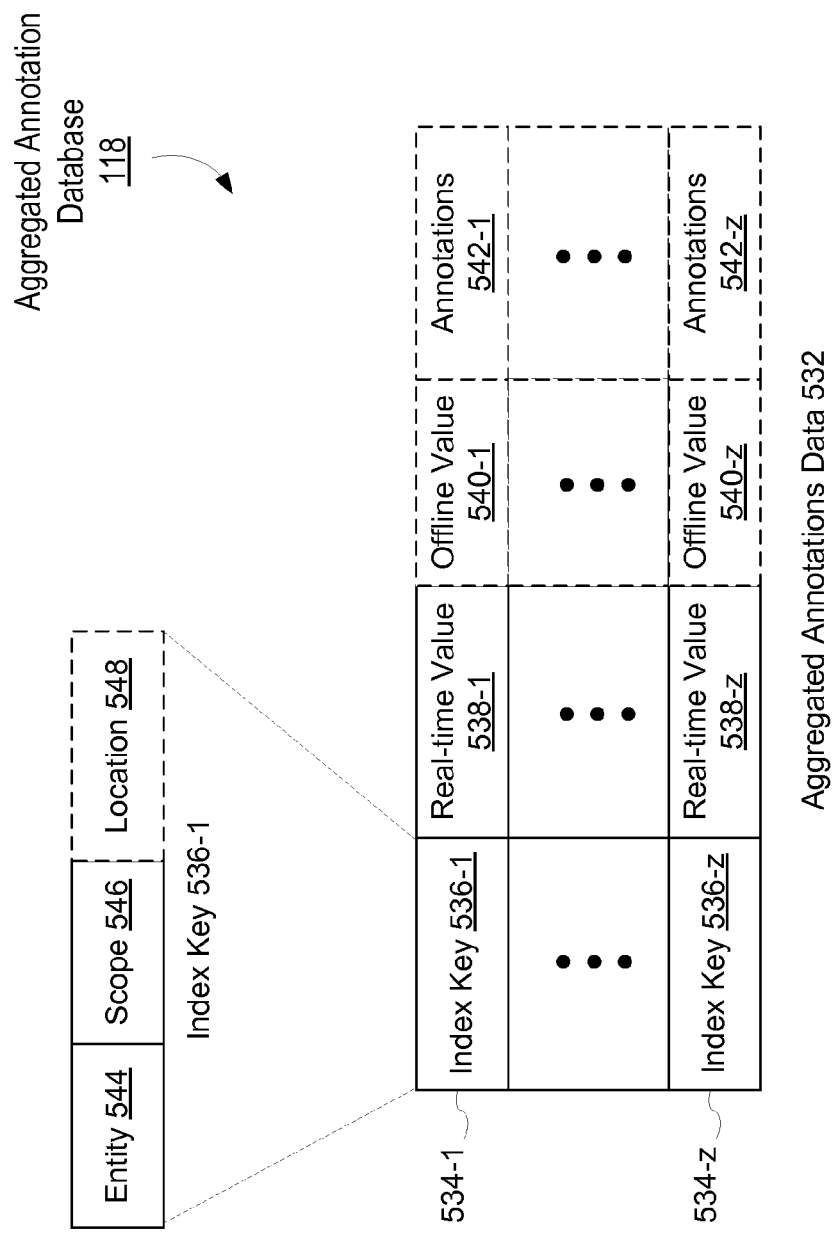
FIG. 5B is a block diagram illustrating exemplary aggregated annotations data, in accordance with some embodiments.

FIG. 5B is a block diagram illustrating exemplary aggregated annotations data 532, in accordance with some embodiments. In these embodiments, aggregated annotations data 532 is stored in aggregated annotation database 118 (FIG. 2).

Aggregated annotations data 532 includes aggregated annotation entries, for example entry 1 (534-1) through entry z (534-z), where z represents the number of entries in aggregated annotations data 532. A respective entry (e.g., entry 534-1) includes an index key (e.g., 536), and a real-time annotation value (e.g., 538). In some embodiments, the respective entry (e.g., entry 534-1) also includes an offline value (e.g., 540-1). Optionally, the respective entry (e.g., entry 534-1) may additionally include annotations (e.g., 542-1). In some embodiments, the annotations (e.g., 542-1) in the respective entry (e.g., entry 534-1) in a respective entry 534 include at least a subset of the annotations 510 (FIG. 5A) for the entity corresponding to the index key 536. In some embodiments, the annotations (e.g., 542-1) in a respective entry (e.g., entry 534-1) are implemented as pointers (or references) to annotations stored in the individual annotations database 116 (e.g., annotations 542-1 comprise pointers to individual annotations 510 in database 116). In some embodiments, aggregated annotations database 118 includes at least a subset of annotations stored in individual annotations database 116.

Index keys 536 typically include entity-scope combinations. A respective entity-scope combination (e.g., 536-1) is based on an entity (e.g., 544) and a scope (e.g., 546). For example, an entity-scope combination for an entity (e.g., URL #1) and a scope (e.g., Group #1) may be represented as [entity, scope] (e.g., [URL #1, Group #1]). In some embodiments, the index key includes a combination of entity 544, scope 546, and location 548. For example, the index key may be represented as [entity, scope, location]. In some embodiments, when the scope is "public," which indicates that anyone can access the corresponding annotation, the index key may be represented by an entity-location combination (e.g., [entity, location]). In some embodiments, the scope includes a null value to indicate that the scope represents a "public" scope. Alternatively, annotation system 108 may maintain a first set of aggregated annotation data (e.g., aggregated "public" annotation data) for annotations with a public scope and a second, distinct, set of aggregated annotation data (e.g., aggregated "non-public" annotation data) for annotations with a non-public scope (e.g., a scope that identifies one or more groups and/or one or more users). In such cases, the index key for the first set of aggregated annotation data may not include the scope, because all data stored in the first set of aggregated annotation data are known to have a public scope.

Real-time annotation value 538 includes one or more values determined by real-time aggregation module 120 (FIG. 2), and offline annotation value 540 includes one or more values determined by offline aggregation module 122 (FIG. 2). Respective real-time annotation value 538 typically represents the number of recently-received annotations that correspond to the respective index key (e.g., 536-1). Respective offline value 540 typically represents the total number of annotations that correspond to the respective index key (e.g., 536-1), excluding those annotations represented by real-time annotation value 538.

FIG. 5C is a block diagram illustrating exemplary data structure 552 that includes contacts of a respective user, in accordance with some embodiments. Contacts data 552 is typically stored in contacts database 226 (FIG. 2). Contacts data 552 include a list of entries (e.g., entries 554-1 through 554-p). Each entry 554 includes a name of a contact. In some embodiments, each entry includes one or more of: identifier 558 (e.g., a username), group(s) 560 (e.g., one or more groups the contact person belongs to, such as family, friends, and coworkers), and affinity 562.

Affinity 562 is a value that represents an importance and/or frequency of communication between the contact and the respective user. Affinity 562 may be set by the user (e.g., by adding the respective contact to a particular group, such as "family," or by manually indicating that the respective contact is important). In some embodiments, affinity 562 for a respective contact is determined by a computer system without human intervention based on, for example, the frequency of communication between the user and the respective contact (e.g., a number of emails exchanged between the two in a predefined time period).

FIGS. 6A-6C are flowcharts representing method 600 of aggregating and sharing annotations, in accordance with some embodiments. The method is performed at a server system having one or more processors and memory storing one or more programs for execution by the one or more processors (e.g., annotation system 108).

As explained below, operations 602 through 612 in FIG. 6A illustrate a real-time aggregation operation, in accordance with some embodiments.

In response to each of a plurality of occurrences of a first predefined trigger (e.g., a real-time aggregation event, such as an entry of a new annotation, a login or logout of an authoring user, etc.) (602), the server system receives (604) an annotation of a respective entity by an author. The respective entity has an entity identifier, and the annotation has a scope that identifies a range of access to the annotation (e.g., 512, FIG. 5A). For example, the server system retrieves annotation 510, scope 512, and entity 514 (FIG. 5A) for a respective entry in annotations 508 from individual annotation database 116 (FIG. 1). In some implementations, the server system also retrieves geographic location information associated with the author (or associated with the client at which the annotation was authored or posted).

The server system identifies (606) one or more database entries 534 in the aggregated annotation database 118 (FIG. 1). A respective database entry 534 includes a first value and a second value (e.g., the first values are real-time aggregation values 538, and the second values are offline aggregation values 540, FIG. 5B). Each database entry 534 corresponds to a respective index key (e.g., 536, FIG. 5B) comprising an entity-scope combination (e.g., a representation [entity, scope] or [scope, entity]), and the entity-scope combination corresponds to a respective entity and a respective scope (e.g., entity 544 and scope 546). For example, the server system may construct an entity-scope combination from the entity (e.g., 514) and scope (e.g., 512) retrieved for the respective annotation. Thereafter, the server system identifies one or more index keys that correspond to the constructed entity-scope combination, and identifies one or more database entries (e.g., 534) that correspond to the one or more identified index keys. In some cases, a single entity-scope combination corresponds to a plurality of index keys. In one example, an entity-scope combination [URL #1, (User A and User B)] may correspond to two index keys: [URL #1, User A] and [URL #1, User B]. In another example, another entity-scope combination [URL #1, Group A] may correspond to multiple index keys: [URL #1, User A-1], [URL #1, User A-2], . . . , [URL #1, User A-q], where User A-1 through User A-q are members of the Group A.

In some embodiments, the annotation is (608) associated with an author identifier (e.g., user identifier 506-1, FIG. 5A). Identifying one or more database entries includes identifying a predefined number of database entries in accordance with respective affinity values (e.g., affinity 562 in contacts data 552, FIG. 5C) between an author of the annotation corresponding to the author identifier and respective users corresponding to the scope. For example, the server system may rank database entries (e.g., database entries corresponding to index keys: [URL #1, User A-1], [URL #1, User A-2], ..., [URL #1, User A-q]), and select the top N entries based on the affinity values, where N is the predefined number of database entries.

In some embodiments, identifying the one or more database entries includes (610): identifying respective users corresponding to the scope of the annotation, and identifying secondary scopes associated with the respective users. Each identified secondary scope includes the author (as well as a respective user who falls within the scope of the annotation being processed). Identifying the one or more database entries also includes: identifying one or more entity-scope combinations corresponding to the entity of the annotation and one of the secondary scopes, and identifying one or more database entries corresponding to the one or more identified entity-scope combination. In some embodiments, identifying the one or more database entries also includes identifying one or more entity-scope combinations corresponding to the entity of the annotation and one scope of: the scope of the annotation and the secondary scopes.

For example, assume that contacts database 226 includes the following groups (e.g., groups in contact information of Alice, Bob, and Charlie):

| User | Group | Members |
| --- | --- | --- |
| Alice | Friends | Bob, Charlie |
| Bob | Coworkers | Alice, Charlie |
|  | Family | Joe |
| Charlie | Friends | Alice, David |

When Alice makes an annotation to be shared with Alice's Friends group, the server system identifies members in the Alice's Friends Group (e.g., Bob and Charlie). The server system identifies groups of Bob and Charlie (e.g., Bob's Coworkers, Bob's Family, and Charlie's Friends) as candidate scopes. Thereafter, the server system identifies, among the candidate scope, scopes that include Alice as a member (e.g., Bob's Coworkers and Charlie's Friends) as secondary scopes. Bob's Family is not a secondary scope, because Bob's Family does not include Alice as a member. The server system updates entries corresponding to the entity of the annotation and one of the following scopes: Alice's Friends, Bob's Coworkers, and Charlie's Friends. Alternatively, the server system may identify members in the scope of the annotation and the secondary scopes (e.g., Bob, Charlie, Alice, and David) as members of an expanded group, and identify entity-scope combinations corresponding to the entity of the annotation and members of the expanded group. This operation is called herein "circle expansion." When selected (e.g., by both the sharing user and the receiving user who "opt-in" to use the circle expansion), the circle expansion allows a respective user to receive additional annotations authored by people who are connected to the user through intermediary users (e.g., users who include the respective user and the authoring users in same groups), thereby increasing the number of annotations the respective user can access.

The server system updates (612) the first value (e.g., real-time value 538) in each of the one or more identified entries without updating the second value (e.g., offline value 540) in each of the one or more identified entries.

Operations 614 through 622 in FIG. 6B illustrate an offline aggregation operation, in accordance with some embodiments. In some embodiments, prior to receiving the request, in response to each of a plurality of occurrences of a second predefined trigger (e.g., an offline aggregation event based on, for example a predefined time interval), the server system retrieves (614, FIG. 6B) a plurality of annotations (e.g., 510, FIG. 5A), and aggregates the retrieved annotations for respective index keys to produce aggregated values. For example, when User A and User B each share a respective web page (e.g., an entity) with Group A (e.g., a scope), the server system aggregates such information to produce an aggregated value, which indicates that two users have shared the respective web page. Each aggregated value is for a respective index key. The server system also identifies a plurality of index keys corresponding to the index keys of a plurality of the aggregated values, and updates the second values (e.g., offline value 540, FIG. 5B) of database entries corresponding to the identified index keys with the aggregated values for the identified index keys. In some cases, the number of the identified index keys may not match the number of the index keys of the aggregated values, because at least one scope of the aggregated values may be divided into multiple smaller scopes, and/or multiple scopes may be represented by a single larger scope.

In some embodiments, updating the second values (e.g., offline values 540) of the database entries corresponding to the identified index keys includes (616) updating the first values (e.g., real-time values 538) of the database entries corresponding to the identified index keys. In some embodiments, updating the first values includes setting the first values to zero (e.g., resetting the first values, because the first values are reflected in the second values).

In some embodiments, respective annotations (e.g., 510, FIG. 5A) are (618) associated with respective timestamps (e.g., 516, FIG. 5A). Retrieving the plurality of annotations includes: determining a time range (e.g., a period since the offline aggregation operation was run last, such as last twelve hours); and retrieving a plurality of annotations that corresponds to the determined time range (e.g., annotations made during the last twelve hours).

In some embodiments, retrieving the plurality of annotations includes (620) updating the first values of the plurality of annotations that corresponds to the determined time range (e.g., resetting the first values of annotations that were recorded during the determined time range).

In some embodiments, aggregating the retrieved annotations for respective index keys includes (622), for each candidate annotation of the plurality of annotations: identifying respective users corresponding to a scope of the candidate annotation, and identifying secondary scopes associated with the respective users. Each identified secondary scope includes an author of the candidate annotation. Aggregating the retrieved annotations for respective index keys also includes: identifying one or more candidate entity-scope combinations corresponding to an entity of the candidate annotation and one of the secondary scopes; and identifying one or more index keys. In some embodiments, aggregating the retrieved annotations for respective index keys also includes identifying one or more candidate entity-scope combinations that correspond to an entity of the candidate annotation and one scope of: the scope of the candidate annotation and the secondary scopes. Each index key comprises a candidate entity-scope combination of the one or more identified candidate entity-scope combinations. Aggregating the retrieved annotations for respective index keys furthermore includes aggregating the retrieved annotations for the identified index keys. In other words, operation 622 includes circle expansion for offline aggregation. The details of circle expansion described with reference to operation 610 apply to operation 622. For brevity, these details are not repeated.

The server system receives (624, FIG. 6C), from a computer system or device distinct from the server system (e.g., social networking service server 104, online service server 110, or client 102, FIG. 1), a request for one or more annotations. The request identifies an entity and a scope.

The server system responds (626) to the request by: retrieving, for an index key comprising an entity-scope combination corresponding to the entity and scope identified in the request, an annotation value from a database entry for the index key (e.g., entry 534 in aggregated annotations data 532, FIG. 5B); and sending, to the computer system or device, information corresponding to the retrieved annotation value in response to the request (e.g., with the annotation retrieval module 124, FIG. 2). The annotation value corresponds to the first value (e.g., the real-time value 538, FIG. 5B) and the second value (e.g., the offline value 540, FIG. 5B) of the database entry for the index key. In some embodiments, the annotation value includes the first value and the second value (e.g., as a pair of values).

In some embodiments, the annotation value corresponding to the first value and the second value is (628) a sum of the first value and the second value. For example, the annotation value is a sum of: a real-time count of a number of users who have shared a respective page and an offline count of a number of users who have shared the respective page. Assume an exemplary case where the offline value may indicate that 35 users have shared a respective web page, and the real-time value may indicate that 8 additional users have shared the respective web page since the last time the offline value was determined. The annotation value is a sum of the offline value and the real-time value, which indicates that total 43 people have shared the respective web page.

In some embodiments, responding to the request includes (630), when the scope identified in the request corresponds to a plurality of scope identifiers: retrieving, for a plurality of index keys comprising a plurality of entity-scope combinations corresponding to the entity and scope identified in the request, annotation values corresponding to the first values and the second values of the database entries for the plurality of index keys; and combining the retrieved annotation values to produce one or more combined retrieved annotation values. Responding to the request also includes sending, to the computer system or device, information corresponding to the one or more combined retrieved annotation values in response to the request. For example, the server system may receive a request for annotations accessible to User A (e.g., the scope is User A), and determine that other scopes (e.g., Group A and Group B) also correspond to User A (e.g., both Group A and Group B include User A as a member). Then, the server system retrieves annotation values for the following scopes: User A, Group A, and Group B; and combines the retrieved annotation values (e.g., calculates one or more sums of the annotation values) and sends the combined aggregated annotation values.

In some embodiments, retrieving annotation values corresponding to the first values and the second values of the database entries for the plurality of index keys includes: retrieving the first values and the second values of the database entries for the plurality of index keys, and determining annotation values for the database entries for the plurality of index keys in accordance with the first values and the second values of the database entries for the plurality of index keys. For example, when the database entries (e.g., 534, FIG. 5B) do not include the retrieved annotation values corresponding to the first values and the second values separate from the first values and the second values, the server system determines annotation values in accordance with the first values and the second values.

Note that details of the processes described above with respect to method 600 are also applicable in an analogous manner to the methods described below, including methods 700 and 800. For brevity, these details are not repeated below.

Figure 7:
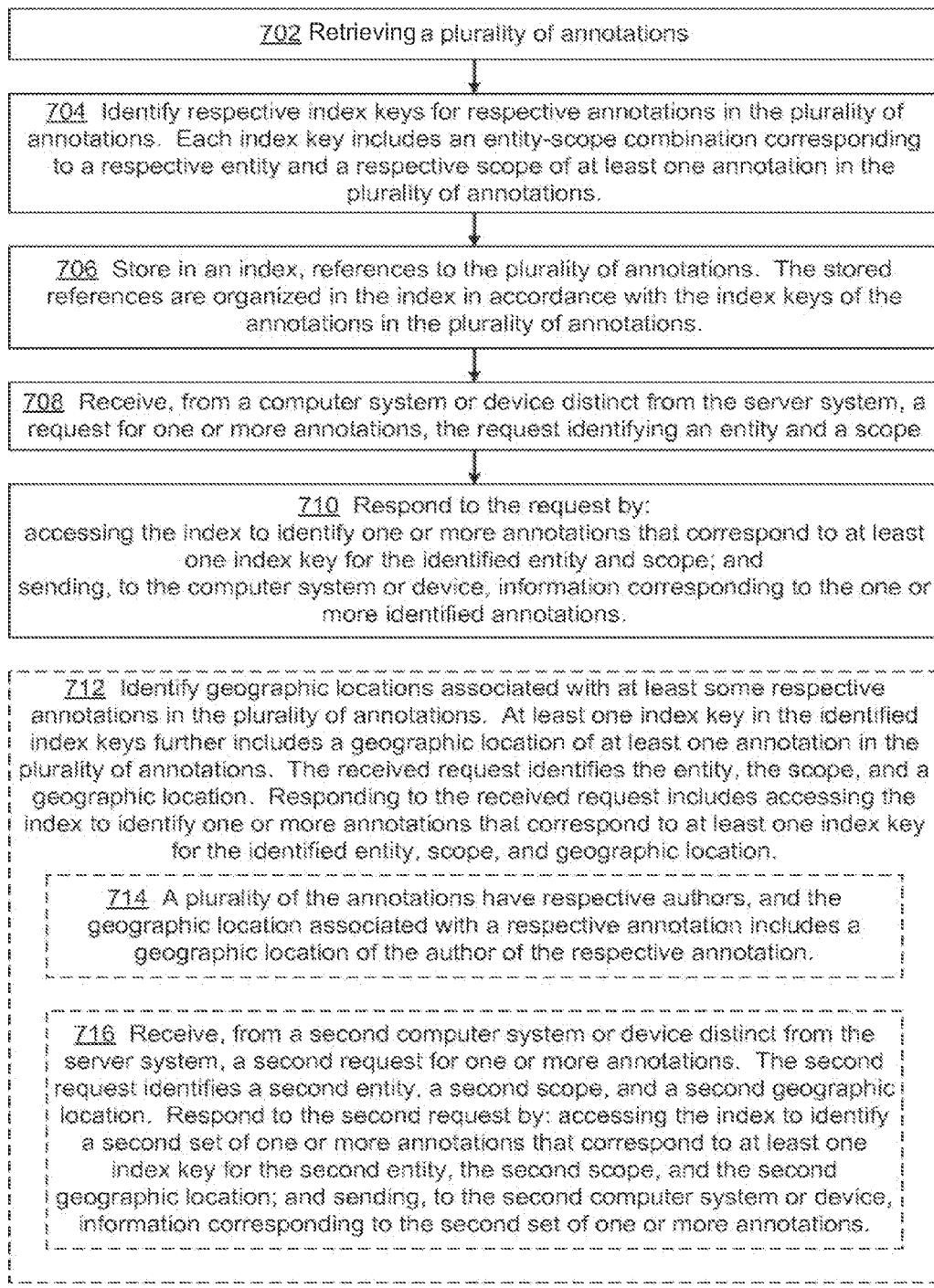
FIG. 7 is a flowchart representing a method of aggregating and sharing annotations based on an entity-scope combination, in accordance with some embodiments.

FIG. 7 is a flowchart representing method 700 of aggregating and sharing annotations based on an entity-scope combination, in accordance with some embodiments. The method is performed at a server system having one or more processors and memory storing one or more programs for execution by the one or more processors (e.g., the annotation system 108).

The server system retrieves (702) a plurality of annotations (e.g., respective annotations 510, FIG. 5A).

The server system identifies (704) respective index keys for respective annotations in the plurality of annotations. Each index key includes an entity-scope combination corresponding to a respective entity and a respective scope of at least one annotation in the plurality of annotations. For example, the server system generates index keys from entities (e.g., 514, FIG. 5A) and scopes (e.g., 512) of respective annotations (e.g., 510).

The server system stores (706) in an index references to the plurality of annotations (e.g., 542, FIG. 5B). The stored references are organized in the index in accordance with the index keys of the annotations in the plurality of annotations (e.g., index keys 536, FIG. 5B).

The server system receives (708), from a computer system or device distinct from the server system (e.g., social networking service server 104, online service server 110, or client 102, FIG. 1), a request for one or more annotations. The request identifies an entity and a scope.

The server system responds (710) to the request by: accessing the index to identify one or more annotations that correspond to at least one index key for the identified entity and scope (e.g., a respective annotation 542 corresponding to a respective index key 536, FIG. 5B); and sending, to the computer system or device, information corresponding to the one or more identified annotations (e.g., one or more of: annotation text, a timestamp of the annotation, the author of the annotation, the real-time value, and the offline value). For example, in FIG. 4, annotation 404-3 indicates that Thomas Jefferson, John Adams, and 43 other people shared a corresponding web page. Prior to displaying user interface 400, the server system identifies search result 402-3 (or the URL of search result 402-3) as an entity and the user (e.g., george.washington@usa.gov) as a scope, identifies one or more corresponding annotations, and sends to a search engine (e.g., 110, FIG. 1) annotation information about the one or more corresponding annotations. In some embodiments, the search engine (e.g., 110, FIG. 1) prepares a search result page, and sends the search result page to a client (e.g., 102, FIG. 1) for display (e.g., user interface 400, FIG. 4).

In some embodiments, the server system identifies (712) geographic locations associated with at least some respective annotations in the plurality of annotations. For example, the server system may identify a geographic location associated with a respective annotation based on a default location of an author (e.g., the user who authored the respective annotation), an IP address that was used to make the respective annotation, a location provided by the author, or a location of the author as determined by the client 102 of the author. At least one index key in the identified index keys further includes a geographic location (e.g., 548, FIG. 5B) of at least one annotation in the plurality of annotations. The received request identifies the entity, the scope, and a geographic location. Responding to the received request includes accessing the index to identify one or more annotations that correspond to at least one index key for the identified entity, scope, and geographic location (e.g., annotation 542 that corresponds to index key 536).

In some embodiments, the geographic location of an annotation is stored only if the author of the annotation elects to share the author's geographic location with other users (i.e., the author decides to "opt-in" for location sharing). In some embodiments, the geographic location is generalized to protect the author's privacy. For example, instead of using a street address, the geographic location may be generalized as one of: a metropolitan area including or closest to the author's location, a portion of a state (e.g., Northern California), a state, or a country.

In some embodiments, a plurality of the annotations has (714) respective authors, and the geographic location associated with a respective annotation includes a geographic location of the author of the respective annotation (e.g., a default location of the author, a location provided by the author, a location of the author as determined by a GPS/location application in a client device, or a location determined based on an IP address used by the author).

In some embodiments, the server system receives (716), from a second computer system or device distinct from the server system (e.g., second social networking service server 104, second online service server 110, or second client 102, FIG. 1), a second request for one or more annotations. The second request identifies a second entity, a second scope, and a second geographic location. The server system responds to the second request by: accessing the index to identify a second set of one or more annotations that correspond to at least one index key for the second entity, the second scope, and the second geographic location; and sending, to the second computer system or device, information corresponding to the second set of one or more annotations.

Note that details of the processes described above with respect to method 700 are also applicable in an analogous manner to method 800 described below. For brevity, these details are not repeated below.

Figure 8:
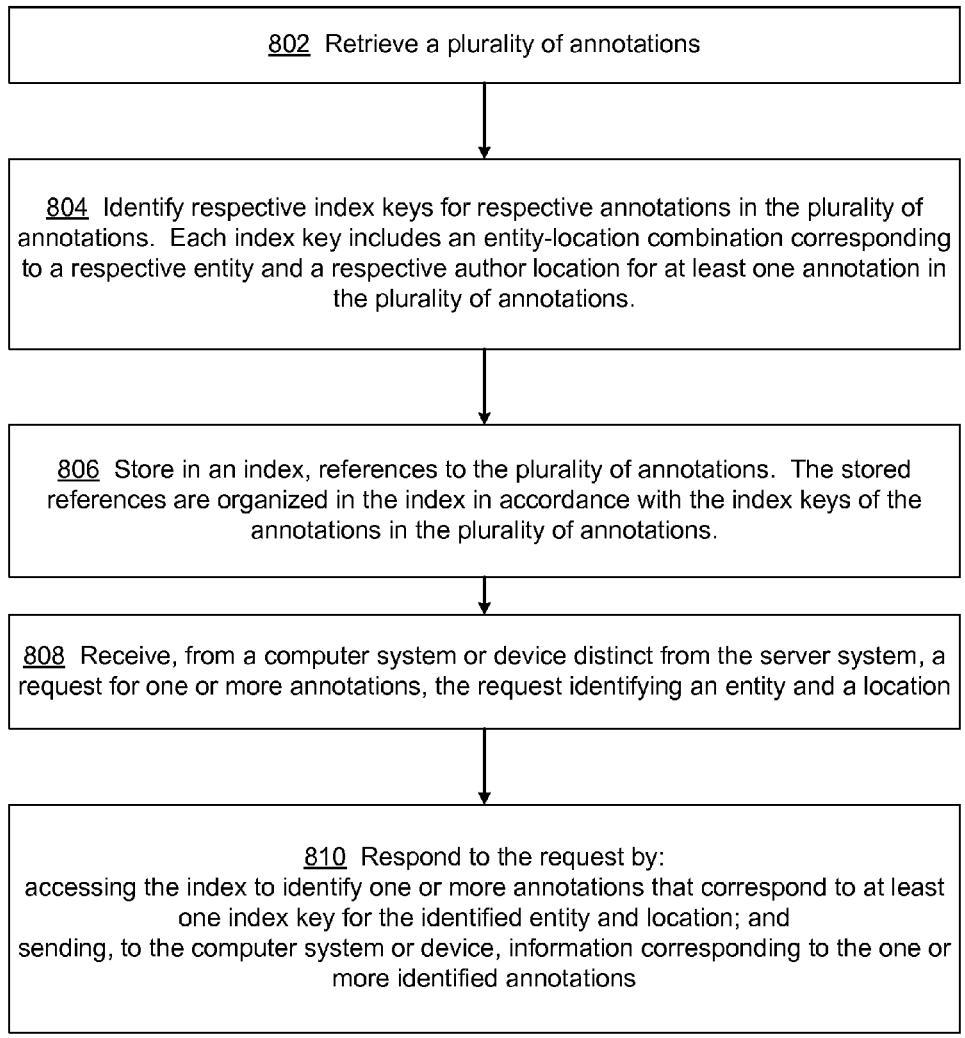
FIG. 8 is a flowchart representing a method of aggregating and sharing annotations based on an entity-location combination, in accordance with some embodiments.

FIG. 8 is a flowchart representing method 800 of aggregating and sharing annotations based on an entity-location combination, in accordance with some embodiments. The method is performed at a server system having one or more processors and memory storing one or more programs for execution by the one or more processors (e.g., the annotation system 108).

The server system retrieves (802) a plurality of annotations (e.g., annotation with a public scope).

The server system identifies (804) respective index keys for respective annotations in the plurality of annotations. Each index key includes an entity-location combination corresponding to a respective entity and a respective author location for at least one annotation in the plurality of annotations. For example, the index key (e.g., index key 536, FIG. 5B) may include a representation [entity, "public", location].

The server system stores (806) in an index references to the plurality of annotations (e.g., annotations 542, FIG. 5B). The stored references are organized in the index in accordance with the index keys of the annotations in the plurality of annotations.

The server system receives (808), from a computer system or device distinct from the server system (e.g., social networking service server 104, online service server 110, or client 102, FIG. 1), a request for one or more annotations. The request identifies an entity and a location (e.g., a default location of the requestor, a location provided by the requestor, a location of the requestor as determined by a GPS/location application in a client device, or a location determined based on an IP address used by the requestor).

The server system responds (810) to the request by: accessing the index to identify one or more annotations that correspond to at least one index key for the identified entity and location; and sending, to the computer system or device, information corresponding to the one or more identified annotations (e.g., one or more of: annotation text, a timestamp of the annotation, the author of the annotation, the real-time value (e.g., real-time counts), and the offline value (e.g., offline counts)). For example, in FIG. 4, annotation 404-4 indicates that 21 people in Northern California shared a corresponding web page. Prior to displaying user interface 400, the server system identifies search result 402-4 (or the URL of search result 402-4) as an entity and Northern California as a location, and sends to a search engine (e.g., 110, FIG. 1) annotation information based on a corresponding entity-location combination. In some embodiments, the search engine (e.g., 110, FIG. 1) prepares a search result page, and sends the search result page to a client (e.g., 102, FIG. 1) for display (e.g., user interface 400, FIG. 4).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a server system having one or more processors and memory storing one or more programs for execution by the one or more processors to perform the method, in response to each of a plurality of occurrences of a first predefined trigger:
receiving an annotation of a respective entity by an author, the respective entity having an entity identifier, the annotation having a scope that identifies a range of access to the annotation;
identifying one or more database entries in a database, a respective database entry including a first value and a second value, wherein the first value includes a real-time count of a number of users who have shared a respective page, and wherein the second value includes an offline count of a number of users who have shared the respective page, each database entry corresponding to a respective index key comprising an entity-scope combination, the entity-scope combination corresponding to a respective entity and a respective scope; and
updating the first value in each of the one or more identified entries without updating the second value in each of the one or more identified entries;
receiving, from a computer system or device distinct from the server system, a request for one or more annotations, the request identifying an entity and a scope; and
responding to the request by:
retrieving, for an index key comprising an entity-scope combination corresponding to the entity and scope identified in the request, an annotation value from a database entry for the index key, the annotation value corresponding to the first value and the second value of the database entry for the index key; and sending, to the computer system or device, information corresponding to the retrieved annotation value in response to the request, wherein prior to receiving the request, in response to each of a plurality of occurrences of a second predefined trigger:

retrieving a plurality of annotations;

aggregating the retrieved annotations for respective index keys to produce aggregated values, wherein each aggregated value is for a respective index key;

identifying a plurality of index keys corresponding to the index keys of a plurality of the aggregated values; and updating the second values of database entries corresponding to the identified index keys with aggregated values for the identified index keys.

2. The method of claim 1, wherein updating the second values of the database entries corresponding to the identified index keys includes updating the first values of the database entries corresponding to the identified index keys.

3. The method of claim 1, wherein respective annotations are associated with respective timestamps; and retrieving the plurality of annotations includes:

determining a time range; and retrieving a plurality of annotations that corresponds to the determined time range.

4. The method of claim 3, wherein retrieving the plurality of annotations includes updating the first values of the plurality of annotations that corresponds to the determined time range.

5. The method of claim 1, wherein aggregating the retrieved annotations for respective index keys includes:

for each candidate annotation of the plurality of annotations:

identifying respective users corresponding to a scope of the candidate annotation;

identifying secondary scopes associated with the respective users, wherein each identified secondary scope includes an author of the candidate annotation;

identifying one or more candidate entity-scope combinations corresponding to an entity of the candidate annotation and one of the secondary scopes; and identifying one or more index keys, each index key comprising a candidate entity-scope combination of the one or more identified candidate entity-scope combinations; and aggregating the retrieved annotations for the identified index keys.

6. The method of claim 1, wherein identifying the one or more database entries includes:

identifying respective users corresponding to the scope of the annotation; identifying secondary scopes associated with the respective users, wherein each identified secondary scope includes the author; identifying one or more entity-scope combinations corresponding to the entity of the annotation and one of the secondary scopes; and identifying one or more database entries corresponding to the one or more identified entity-scope combination.

7. The method of claim 1, wherein the annotation value corresponding to the first value and the second value is a sum of the first value and the second value.

8. The method of claim 1, wherein responding to the request includes:

when the scope identified in the request corresponds to a plurality of scope identifiers: retrieving, for a plurality of index keys comprising a plurality of entity-scope combinations corresponding to the entity and scope identified in the request, annotation values corresponding to the first values and the second values of the database entries for the plurality of index keys, and combining the retrieved annotation values to produce one or more combined retrieved annotation values; and sending, to the computer system or device, information corresponding to the one or more combined retrieved annotation values in response to the request.

9. The method of claim 1, wherein the annotation is associated with an author identifier; and identifying one or more database entries includes identifying a predefined number of database entries in accordance with respective affinity values between an author of the annotation corresponding to the author identifier and respective users corresponding to the scope.

10. A server system, comprising one or more processors and memory storing one or more programs for execution by the one or more processors, the one or more programs comprising instructions for:

responding to each of a plurality of occurrences of a first predefined trigger by:

receiving an annotation of a respective entity by an author, the respective entity having an entity identifier, the annotation having a scope that identifies a range of access to the annotation;

identifying one or more database entries in a database, a respective database entry including a first value and a second value, wherein the first value includes a real-time count of a number of users who have shared a respective page, and wherein the second value includes an offline count of a number of users who have shared the respective page, each database entry corresponding to a respective index key comprising an entity-scope combination, the entity-scope combination corresponding to a respective entity and a respective scope; and updating the first value in each of the one or more identified entries without updating the second value in each of the one or more identified entries;

receiving, from a computer system or device distinct from the server system, a request for one or more annotations, the request identifying an entity and a scope; and responding to the request by:

retrieving, for an index key comprising an entity-scope combination corresponding to the entity and scope identified in the request, an annotation value from a database entry for the index key, the annotation value corresponding to the first value and the second value of the database entry for the index key; and sending, to the computer system or device, information corresponding to the retrieved annotation value in response to the request, wherein prior to receiving the request, in response to each of a plurality of occurrences of a second predefined trigger:

retrieving a plurality of annotations;

aggregating the retrieved annotations for respective index keys to produce aggregated values, wherein each aggregated value is for a respective index key;

identifying a plurality of index keys corresponding to the index keys of a plurality of the aggregated values; and updating the second values of database entries corresponding to the identified index keys with aggregated values for the identified index keys.

11. The server system of claim 10, wherein updating the second values of the database entries corresponding to the identified index keys includes updating the first values of the database entries corresponding to the identified index keys.

12. A non-transitory computer readable storage medium, storing one or more programs for execution by one or more processors of a server system, the one or more programs comprising instructions for:

- responding to each of a plurality of occurrences of a first predefined trigger by:
- receiving an annotation of a respective entity by an author, the respective entity having an entity identifier, the annotation having a scope that identifies a range of access to the annotation;
- identifying one or more database entries in a database, a respective database entry including a first value and a second value, wherein the first value includes a real-time count of a number of users who have shared a respective page, and wherein the second value includes an offline count of a number of users who have shared the respective page, each database entry corresponding to a respective index key comprising an entity-scope combination, the entity-scope combination
- corresponding to a respective entity and a respective scope; and
- updating the first value in each of the one or more identified entries without updating the second value in each of the one or more identified entries;
- receiving, from a computer system or device distinct from the server system, a request for one or more annotations, the request identifying an entity and a scope; and
- responding to the request by:
  - retrieving, for an index key comprising an entity-scope combination corresponding to the entity and scope identified in the request, an annotation value from a database entry for the index key, the annotation value corresponding to the first value and the second value of the database entry for the index key; and
  - sending, to the computer system or device, information corresponding to the
  - retrieved annotation value in response to the request, wherein prior to receiving the request, in response to each of a plurality of occurrences of a second predefined trigger:
- retrieving a plurality of annotations;
- aggregating the retrieved annotations for respective index keys to produce aggregated values, wherein each aggregated value is for a respective index key;
- identifying a plurality of index keys corresponding to the index keys of a plurality of the aggregated values; and
- updating the second values of database entries corresponding to the identified index keys with aggregated values for the identified index keys.

13. The non-transitory computer readable storage medium of claim 12, wherein updating the second values of the database entries corresponding to the identified index keys includes updating the first values of the database entries corresponding to the identified index keys.

\* \* \* \* \*